United States Patent [19]

Goldmann et al.

[11] Patent Number: 4,899,035

[45] Date of Patent: Feb. 6, 1990

[54] SCANNING DEVICE FOR A CHIP CARD

[75] Inventors: Peter Goldmann; Gerhard Habelt, both of Vienna; Hans Weihs, Purkersdorf, all of Austria

[73] Assignee: U.S. Philips Corporation, New York, N.Y.

[21] Appl. No.: 262,914

[22] Filed: Oct. 25, 1988

[30] Foreign Application Priority Data

Oct. 27, 1987 [AT] Austria .................................. 2821/87

[51] Int. Cl.⁴ ............................................. G06K 7/06
[52] U.S. Cl. ..................................... 235/441; 235/479
[58] Field of Search ......................... 235/441, 482, 483

[56] References Cited

U.S. PATENT DOCUMENTS 4,810,863 3/1989 Kachi et al. ......................... 235/441

Primary Examiner—Harold I. Pitts

[57] ABSTRACT

A lever arm (14) carrying a set of contacts (16) is pivoted towards the operating position of a chip card by a slide (18) which is slidably guided parallel to the direction of insertion of a chip card into the scanning device. It is in turn displaceable by an individual operating member (17) to be operated by hand.

9 Claims, 3 Drawing Sheets

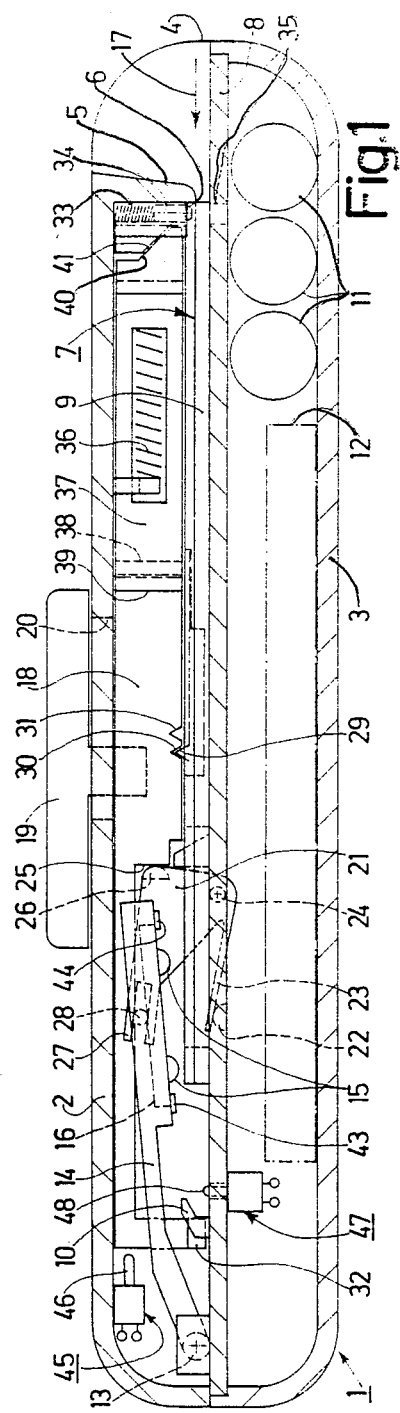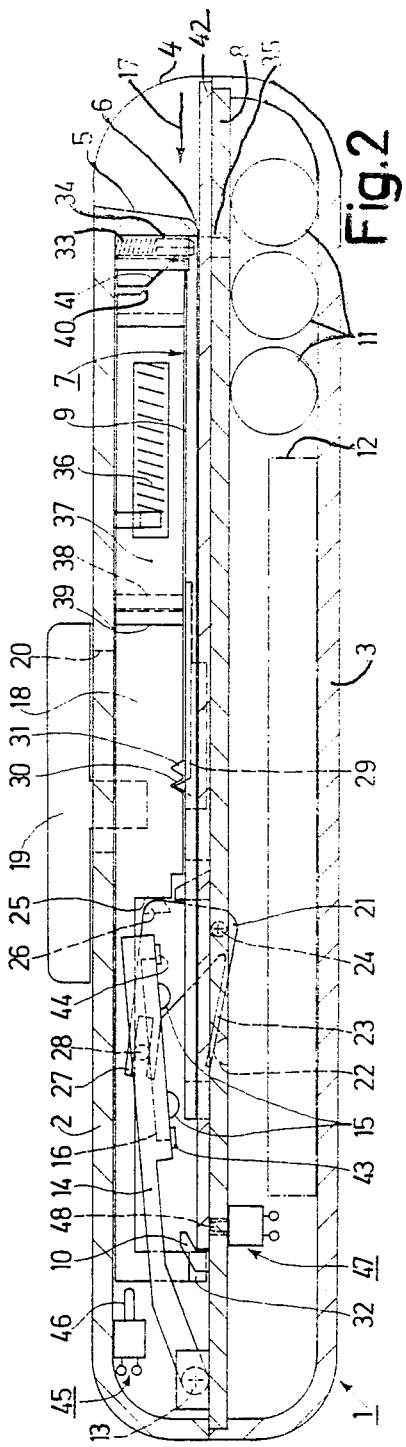

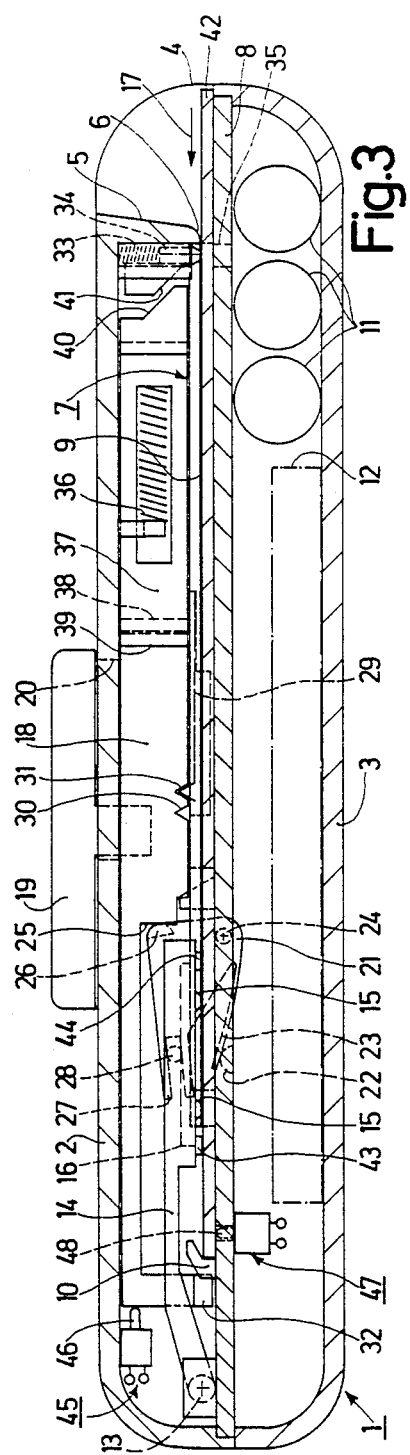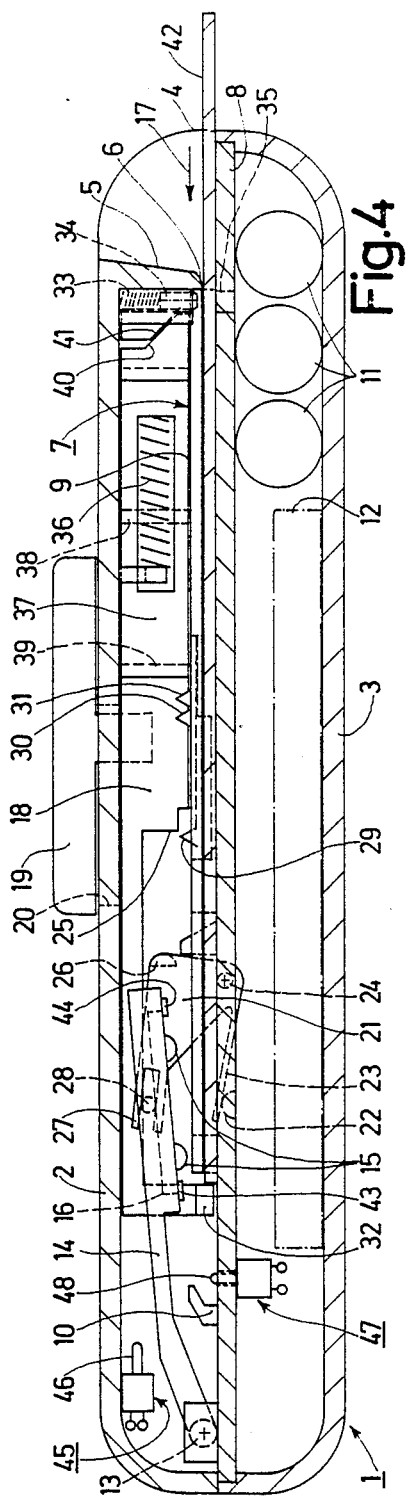

SCANNING DEVICE FOR A CHIP CARD

BACKGROUND OF THE INVENTION

The invention relates to a scanning device for a chip card. A lever arm pivotably journalled on the side of the device carries a set of contacts and can be pivoted towards a chip card inserted into the scanning device to occupy an operating position, the set of contacts contacting contacts provided on the chip card. Such a contacting of the chip card is required to permit of making operative and evaluating, respectively, the integrated circuit which is contained in the chip card and may comprise, for example, one or more memories and a processor. Such chip cards are used, for example, in bank intercourse, in trading for payment purposes, for identification of persons entitled to carry out specific transactions, and the like. In a scanning device known from European Patent Application No. 0 235 022 of the kind mentioned in the opening paragraph, a cam disk cooperating with the level arm is provided for pivoting the lever arm carrying the set of contacts towards the operating position of a chip card and away from this position, respectively, which cam disk can be driven by means of a gear from a motor. When using such a motor control, the construction of the scanning device becomes comparatively complicated and comparatively bulky, however. On the contrary, scanning devices are also known, in which in dependence upon the insertion into such a device and the removal therefrom, respectively, the contacting of the chip card is controlled. For example, German Patent Application No. 3602668 shows a scanning device, in which upon insertion of a chip card into this device a card pick-up device journalled so as to be moveble in a reciprocating manner is displaced from the chip card, a contact carrier being brought into contact with the contacts of the chip card either by a lowering of the contact carrier onto the chip card controlled through cam tracks or by a lifting of the contact region of the chip card towards the contact carrier controlled by means of a leading ramp. The chip card is then held in its operating position through a snapping device cooperating with the card pick-up device and is slid again out of its operating position from the scanning device by releasing the snapping device. In another embodiment of a scanning device indicated in German Patent No. 2952442, upon insertion of a chip card into this device from the chip card a displaceably and pivotally journalled contact carrier is displaced towards the chip card, no separate device for removing the chip card from the scanning device being provided, but the chip card being pulled by hand out of the scanning device and the contact carrier being again displaced in a direction away from the chip card. In such contact devices controlled from a chip card, it has appeared that either damage of the chip card or of the contact carrier can occur if, for example, an excessively great force is exerted by hand on the chip card or that no perfect contacting of the chip card is obtained because the contact carrier is not displaced sufficiently accurately.

SUMMARY OF THE INVENTION

The lever arm carrying the set of contacts is pivoted towards the operating position of a chip card by a slide slidably guided parallel to the direction of insertion of a chip card into the scanning device, which slide is in turn displaceable by means of an individual operating member that can be manually operated. Thus, a damage of the chip card or of the set of contacts on the side of the device is avoided because the chip card can be inserted simply, without having to overcome an obstacle, into its operating position in the scanning device, after which its perfect contacting with the set of contacts carried by the pivotably arranged lever arm can take place in a reliable manner by means of the specifically provided operating member from the slide. Moreover, a very simple and space-saving construction of the scanning device is obtained, which permits, for example, of constructing such a scanning device also as a pocket device easy in use, of comparatively small size and more particularly of planar construction.

It has proved to be advantageous if, starting from a rest position, the slide can be displaced from the operating member in opposite directions to two further positions. During its displacement from the rest position in the insertion direction the slide causes pivoting of the lever arm carrying the set of contacts towards the operating position of a chipcard. During its displacement from the rest position in a direction opposite to the insertion direction, the slide causes a chipcard in the operating position to be slid at least partly out of the device by means of a projection formed on the slide. Thus, from the individual operating member, it is ensured through the slide now fulfilling two functions that the contacting of a chip card located in its operating position in the scanning device is controlled and that it is slid out of its operating position in the scanning device. Again a reliable contacting of the set of contacts on the side of the device with the contacts on the chip card is achieved without a particular load of the chip card, which could damage the card or the set of contacts. Also, when a chip card is slid out of its operating position in the scanning device, no damage can occur because this is not brought about by the individual operating member until the slide and the lever arm controlled by it have been transferred to the operating position and hence the set of contacts has already been reliably pivoted away from the chip card. In this case a simple and space-saving construction of the scanning device is again obtained.

For pivoting the lever arm carrying the set of contacts towards the operating position of a chip card a further lever arm may be provided. The further arm is pivotable by the slide against the action of a spring, is journalled on the side of the device and in turn cooperates with the lever arm carrying the set of contacts. Thus, a reliable pivoting requiring the exertion of only little force of the lever arm carrying the set of contacts towards the operating position of a chip card and hence a particularly reliable contacting of the set of contacts with the contacts on the chip card is attained. For example, for this purpose the further lever arm may simply engage a shoulder provided at the lever arm carrying the set of contacts and subjected to the action of a spring.

In this connection, however, it has proved to be particularly advantageous if the further lever arm has a bifurcate end, by which it encloses a shoulder provided at the lever arm carrying the set of contacts. Thus, the lever arm carrying the set of contacts is forcibly taken along by the further lever arm, both when pivoting the lever arm carrying the set of contacts towards the operating position of a chip card and away from the latter, as a result of which a particularly reliable pivoting of the lever arm carrying the set of contacts is attained without it being necessary to provide for its pivoting from the operating position of a chip card a separate spring engaging it and an abutment stop limiting its path of displacement.

A locking device controlled by the slide and loaded by a spring may be released displacement of the slide for pivoting the lever arm carrying the set of contacts towards the operating position of a chip card locking device controlled by the slide and loaded by a spring may be released. This locks the path of insertion of a chip card into the scanning device at the area of the operating position of a chip card in the scanning device. When providing such a locking device also controlled by the slide, it is achieved that no chip card can be inserted into the scanning device if the lever arm carrying the set of contacts is pivoted towards the operating position of a chip card, as a result of which a damage of the chip card or of the set of contacts is avoided in a reliable manner. Further, it is thus achieved that with a chip card located in the operating position when pivoting the lever arm carrying the set of contacts towards it at the same time the locking device also engages the chip card and hence presses under the action of the spring acting upon it on the chip card, as a result of which said card is held in its operating position besides due to the action of the lever arm pressing on it and carrying the set of contacts also due to the locking device pressing on it so that with comparatively great certainty it cannot slide out of the scanning device when this is not desired.

In this connection, it has further proved to be advantageous if for controlling the locking device from the slide a spring-loaded drag switch is provided, which can be coupled to the slide, cooperates with the locking device and is taken along by the slide during its displacement for pivoting the lever arm carrying the set of contacts towards the operating position of a chip card. Thus, the locking device is controlled perfectly and reliably.

Further, it has proved to be advantageous if upon displacement of the slide for pivoting the lever arm carrying the set of contacts towards the operating position of a chip card a switching device can be operated from the slide, which switches on the electrical functions of the scanning device. Thus, a chip card can be brought to its operating position in the scanning device without the electrical functions of the scanning device being immediately switched on; on the contrary, this takes place only when the lever arm carrying the set of contacts is intentionally pivoted towards the operating position of a chip card through the individual operating member from the slide. Thus, a separate switch for switching on the electrical functions of the scanning device also becomes superfluous.

In this connection, it has also proved to be advantageous if the switching device is functionally connected in series with a further switch, which is switched on from a chip card located in its operating position in the scanning device. Thus, it is achieved that the electrical functions of the scanning device in fact can be switched on only if a chip card is in its operating position in the scanning device and moreover the lever arm carrying the set of contacts is pivoted towards the operating position of a chip card. It should be noted that switches fixing a chip card located in its operating position in the scanning device and switching on given electrical functions of the scanning device in dependence thereupon, are known per se, while such a switch may also be combined with the contact member of the scanning device to be brought into contact with the contacts on the chip card, as is indicated in the aforementioned German Patent Application No. 3602668.

Providing an indication device which can be switched on by the further switch would indicate optically or acoustically whether a chip card is in its operating position in the scanning device, independently of whether the electrical functions of the scanning device themselves are switched on.

BRIEF DESCRIPTION OF THE DRAWINGS

FIG. 1 shows a scanning device for a chip card without a chip card inserted into it, the slide being in its rest position;

FIG. 2 shows the scanning device with a chip card inserted into it;

FIG. 3 shows the lever arm pivoted in the insertion direction;

FIG. 4 shows a chip card slid partly out of the operating position;

DETAILED DESCRIPTION OF THE PREFERRED EMBODIMENTS

Figure 5:
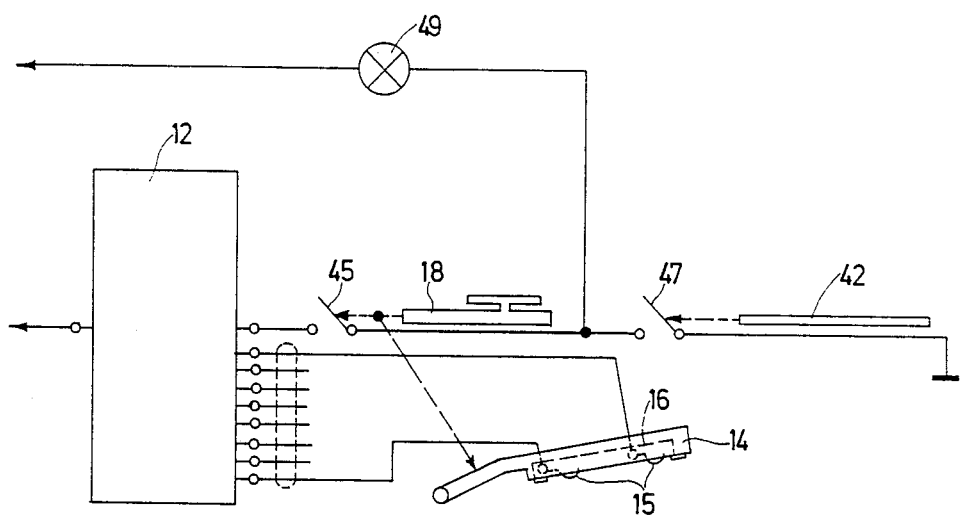
FIG. 5 shows a circuit arrangement for switching on the electrical functions of the scanning device.

In FIG. 1, reference numeral 1 denotes the housing in the form of a comparatively flat box of a scanning device for a chip card, which housing comprises two dish-shaped housing halves 2 and 3. In order to insert a chip card into the scanning device, in the present embodiment an indentation 5 is provided at the area of a narrow side 4 of the housing half 2, which indentation projects beyond the width of a chip card, is located on the side of the housing and is provided with an insertion opening 6 for inserting a chip card, which opening is adjoined by an insertion track 7, which is limited on the one hand by a mounting plate 8 for flatly guiding a chip card to be inserted and on the other hand by two lateral guide grooves 9, of which only one is shown in FIG. 1, for the chip card. A chip card can be inserted into the scanning device as far as a stop 10 provided on the mounting plate 8 along said insertion track 7, as a result of which its operating position is defined in the scanning device. When providing such an indentation 5 on the side of the housing, a chip card to be inserted into the scanning device can readily be inserted by the fingers into its operating position in the scanning device. Such an indentation 5 is not absolutely necessary, however, because a chip card can also be simply inserted only by the finger tips through an insertion opening located immediately at the area of the narrow side 4 of the dish-shaped housing half 2 into the scanning device until it reaches its operating position. As is apparent, no obstacles are in the way of a chip card to be inserted into the scanning device until it reaches its operating position in the scanning device so that there is no risk of damage of the chip card or of other parts of the scanning device.

The space present between the dish-shaped housing half 3 and the mounting plate 8 can accommodate, for example, batteries 11 for the voltage supply of the scanning device and the electronic devices 12 required for operating the scanning device shown diagrammatically in FIG. 1. In the present case, the space present between the dish-shaped housing half 2 and the mounting plate 8 accommodates the mechanical members of the scanning device. A component of these mechanical members is a lever arm 14, which is pivotably journalled by means of a top 13 on the mounting plate 8 towards the operating position of a chip card and carries a set of contacts 16 having several resilient contact elements 15. When the lever arm 14 is pivoted towards the operating position of a chip card, these contact elements 15 serve to contact the contacts provided on the chip card, through which contacts the integrated circuit contained in the chip card can be made operative. In order to guarantee a perfect operation of the scanning device, a reliable contacting of the contact elements 15 with the contacts on the chip card is of particular importance, which also necessitates a perfect pivoting of the lever arm 14 carrying the set of contacts 16 towards the operating position of a chip card. For this purpose, it is ensured that the lever arm 14 is pivoted by a slide 18 slidably guided parallel to the direction of insertion of a chip card into the scanning device indicated by the arrow 17, which slide, starting from a rest position shown in FIG. 1, can be displaced by an individual operating member 19 to be manually operated in opposite directions to two further positions. In the present case, the operating member 19 is in the form of a sliding button immediately coupled to the slide 18, for example by means of a snap connection, and passed through a slot 20 provided in the dish-shaped housing half 2. For example, however, it would also be possible without further expedients to construct such an operating member 19 as a rotating knob, from which the slide 18 can be displaced through a lever control from its rest position in opposite directions to two further positions.

For pivoting the lever arm 14 carrying the set of contacts 16 from the slide 18, for example, the slide 18 could cooperate immediately through a leading ramp provided on it with a shoulder provided at the lever arm 14 subjected to the action of a spring. As is ensured in the present embodiment, however, it has proved to be advantageous if a further lever arm 21 is provided, which is pivotable against the action of a spring, is journalled on the side of the device and in turn cooperates with the lever arm 14 carrying the set of contacts 16, as a result of which a reliable pivoting requiring the exertion of only little force of this lever arm 14 is attained. The spring loading the further lever arm 21 is constituted in the present case simply by an elastically resilient arm 23 bearing on a shoulder 22 on the mounting plate 8 and cantilevering from the further lever arm 21. As point of support for the further lever arm 21 serves a tap 24, which is provided on the mounting plate 8 and engages into a corresponding recess at the further lever arm 21. Upon displacement of the slide 18 from its rest position in a direction equal to the direction of insertion of a chip card into the scanning device, the further lever arm 21 is pivoted from the slide 18 in that a projection 25 provided on the slide 18 cooperates with a shoulder 26 provided on the further lever arm 21, as a result of which the further lever arm 21 is pivoted in a counterclockwise direction, as is shown in FIG. 3. In the present case, the cooperation of the further lever arm 21 with the lever arm 14 carrying the set of contacts 16 is obtained in that the further lever arm 21 has a bifurcate end 27, by which it encloses a shoulder 28 provided on the lever arm 14 carrying the set of contacts 16. Thus, the lever arm 14 carrying the set of contacts 16 is forcibly taken along by the further lever arm 21 when pivoting the lever arm 14 both towards the operating position of a chip card and away from this position, as a result of which a very reliable pivoting of the lever arm 14 is attained without its pivoting away from the operating position of a chip card requiring a separate spring engaging it and an abutment stop limiting its path of displacement. In a usual manner, both the rest position of the slide 18 and its further position, to which it is displaced upon its displacement from the rest position in a direction equal to the direction of insertion of a chip card into the scanning device and in which it holds the lever arm 14 carrying the set of contacts 16 pivoted towards the operating position of a chip card, zre ensured each time by a snapping member. In the present case, these snapping members are simply constituted by a hook-shaped snapping spring 29, which is arranged on the side of the device and engages by its hook-shaped end into recesses 30 and 31, respectively, formed at it in accordance with the two positions of the slide 18. Of course, there are also further possibilities for the construction of such snapping members within the scope of the relevant prior art, such as, for example, spherical snapping members and the like. Likewise, for displacing the parts of the device, in known manner, an excess stroke operative in the path of displacement of the parts of the device could be ensured by providing spring-loaded intermediate parts in order to compensate for tolerances and the like.

The slide 18 further has at its end facing the lever arm 14 a shoulder 32, which is rectangularly bent into the shape of an L and in the rest position of the slide 18 becomes located with its free end in the region of the end of the insertion track 7 of a chip card into the scanning device so that with a chip card inserted into the scanning device and located in its operating position it is situated in front of the front edge of said card. Thus, there is a possibility to slide a chip card located in its operating position in the scanning device by displacement of the slide 18 from its rest position in a direction opposite to the insertion direction of a chip card into the scanning device at least in part out of the scanning device so that it can easily be gripped by and hand can be completely withdrawn from the scanning device, as will further be explained with reference to FIG. 4.

Further, the scanning device has a locking device 34 for the insertion track 7 of a chip card into the scanning device, which is loaded by a spring supported on the side of the device and can also be controlled by the slide 18. Upon displacement of the slide 18 from its rest position in a direction equal to the direction of insertion of a chip card into the scanning device the locking device 34 is released by the slide 18, as a result of which the locking device 34 attempts under the action of the spring 33 acting upon it to lock the insertion track 7 of a chip card into the scanning device at the area of the operating position of a chip card in the scanning device, for which purpose in accordance with the position of the locking device 34 the mounting plate 8 is provided with a recess 35, into which the locking device 34 can engage. Efficaciously, the position of the locking device 34 is chosen as fare as possible at the beginning of the insertion track 7 of a chip card into the scanning device in order that an undesired insertion of a chip card into the scanning device is prevented at an earliest possible stage. If a chip card has already been inserted into its operating position in the scanning device and if only then the locking device 34 is released by the slide 18, the locking device 34 engages, because it is operative at the area of the operating position of a chip card in the scanning device, the chip card itself and presses it against the mounting plate 8, like it occurs by the lever arm 14 carrying the set of contacts 16. Thus, it is counteracted that the chip card slides unintentionally out of its operating position in the scanning device.

In the present case, for controlling the locking device 34 by means of the slide 18, a drag slide 37 is provided, which is slidably guided also parallel to the direction of insertion of a chip card into the scanning device and is subjected to the action of a spring 36 supported on the side of the device. The cooperation of the slide 18 with this drag slide 37 is obtained in that a shoulder 38 provided at the end of the slide 18 facing the drag slide 37 engages behind a corresponding shoulder 39 provided at the end of the drag slide 37 facing the slide 18. By the end remote from the slide 18, the drag slide 37 cooperates through a control surface 40 provided at it with a corresponding control surface 41 provided at the locking device 34. Thus, the drag slide 37 is taken along by the slide 18 upon its displacement from the rest position in a direction equal to the direction of insertion of a chip card into the scanning device due to the cooperation of the shoulders 38 and 39, as a result of which the control surface 40 provided at the drag switch 37 releases the locking device 34 through the control surface 41 provided at the locking device 34 for its displacement in the direction towards the insertion track 7 of a chip card into the scanning device, as shown in FIG. 3. If on the contrary the slide 18 is displaced from its rest position in a direction opposite to the direction of insertion of a chip card into the scanning device, the drag switch 37 is not taken along by it because no cooperation of the shoulders 38 and 39 is obtained, as a result of which the locking device 34 remains in its released position for the insertion track 7 of a chip card into the scanning device, as shown in FIG. 4. Thus, a perfect and reliable control of the locking device 34 by the slide 18 is obtained. It would be possible without expedients, however, that the locking device 34 is controlled by the slide 18 directly or through other control elements, such as, for example, a control lever.

As is apparent, the mechanical members of the scanning device described above permit of obtaining a simple and space-saving construction of the latter, which renders it possible in particular to construct the scanning device with small and flat outer dimensions so that it is very manipulable, as a result of which it may also be constructed, for example, as a pocket device.

If now a chip card 42 is inserted into a scanning device as shown in FIG. 1 in the direction of the arrow 17 through the insertion opening 6 provided in the dish-shaped housing half 2 along the insertion track 7, it reaches its operating position in the scanning device without having to overcome an obstacle, its front edge engaging the abutment stop 10 provided at the mounting plate 8, as is shown in FIG. 2. If the scanning device should then be made operative, the slide 18 is then inserted by the operating member 19 from its rest position in a direction equal to the direction of insertion of a chip card 42 into the scanning device, as a result of which the further lever arm 21 is pivoted in a counterclockwise direction through the shoulder 25, which is provided at it and cooperates with the shoulder 26 provided at the further lever arm 21, the latter then pivoting through its bifurcate end 27, which cooperates with the shoulder 28 provided at the lever arm 14 carrying the set of contacts 16, the lever arm 14 in turn in clockwise direction until it engages by shoulders 43 and 44 provided at it the chip card 42, as is shown in FIG. 3. In this position, the displaced parts of the device are locked against displacement by the snapping spring 29 engaging the slide 18 and then received by its recess 31. By means of the resilient contact elements 15, the contacts provided on the chip card 42 are contacted. During this displacement of the slide 18, the drag slide 37 was taken along by the slide 18 and was thus also displaced in a direction equal to the direction of insertion of a chip card 42 into the scanning device, as a result of which it has released in turn the locking device 34, which then has engaged the chip card 42 and presses this card under the action of the spring 33 against the mounting plate 8. In this position of the slide 18, the chip card 42 is thus held by the shoulders 43 and 44 pressing on it and the contact elements 15 from the lever arm 14 and additionally from the locking device 34 in its operating position in the scanning device so that it cannot slide out of it unintentionally.

Further, the scanning device has a switching device 45, whose operating member 46 lies in the path of displacement of the slide 18 from its rest position in a direction equal to the direction of insertion of a chip card 42 into the scanning device, as a result of which the scanning device 45 is operated during the transfer of the slide 18 to the position, in which it holds the lever arm 14 carrying the set of contacts 16 pivoted towards the operating position of a chip card 42. In the present embodiment, a further switch 47 is provided, whose operating member 48 extends into the insertion track 7 of a chip card 42 into the scanning device, as a result of which this switch 47 is operated upon insertion of a chip card 42 into the scanning device. As is apparent from the circuit diagram shown in FIG. 5, the switching device 45 and the further switch 47 are connected functionally in series with the electronic device 12 of the scanning device, as a result of which the electrical functions of the scanning device are switched on when the switching device 45 and the further switch 47 are operated simultaneously, which is the case if a chip card 42 is in its operating position in the scanning device and the set of contacts 16 is pivoted towards it. Thus, the electrical functions of the scanning device can be switched on only if a chip card 42 is in its operating position in the scanning device, which in the present case is indicated by a signalization device 49 constituted, for example, by an incandescent lamp and connected to the junction point of the switching device 45 and of the further switch 47.

In case no chip card 42 is inserted into the scanning device and nevertheless the slide 18 is displaced by the operating member 19 from its rest position in a direction equal to the direction of insertion of a chip card 42 into the scanning device and the lever arm 14 carrying the set of contacts 16 is pivoted towards the operating position of a chip card 42, the drag slide 37 is taken along by the slide 18 and thus the locking device 34 is released, which now is received by the recess 35 provided in the mounting plate 8. As a result, the insertion track 7 of a chip card 42 into the scanning device is locked and consequently, it is prevented that a chip card 42 can be inserted into it if the lever arm 14 carrying the set of contacts 16 is in its position pivoted towards the operating position of a chip card 42, as a result of which a damage both of a chip card 42 and of the set of contacts 16 is avoided, whilst moreover the electrical functions of the scanning device cannot be switched on because in such a case the further switch 47 is opened.

The electrical functions of the scanning device can be switched off again with a chip card 42 located in its operating position and with a lever arm 14 pivoted towards it and carrying the set of contacts 16 in that the slide 18 is displaced back to its rest position in a direction opposite to the direction of insertion of a chip card 42 into the scanning device, the switching device 45 then being opened and the lever arm 14 being pivoted away from the operating position of the chip card 42 by the further lever arm 21 due to the resilient action of its arm 23. The locking device 34 is also transferred by the drag slide 37, which is subjected to the action of the spring 36 and is in turn released by the slide 18, to its released position. As soon as the slide 18 has reached its rest position as shown in FIG. 1, the chip card 42 located in its operating position could itself be pulled without hindrance by hand out of the scanning device in that at the area of the indentation 5 on the side of the housing a pressure force is exerted on it by the fingers and it is displaced in a direction opposite to the direction of insertion along the mounting plate 8. However, it has proved to be more favourable for the operation if the chip card 42, as shown in the present embodiment, can be slid at least in part out of the scanning device by the slide 18 so that it can then be seized by hand on both sides and can readily be pulled out of the scanning device. For this purpose, the slide 18 is displaced from its rest position by means of the operating member 19 in a direction opposite to the direction of insertion of a chip card 42 into the scaning device, the shoulder 32, which is provided at it and located before the front edge of the chip card in its operating position, taking along the chip card 42 and sliding it out of the scanning device along the insertion track 7 until it projects at least in part from the housing 1 of the scanning device. With such a displacement of the slide 18, the drag switch 37 is not taken along by the latter, as a result of which the locking device 34 is further held in its released position and hence a chip card 42 can be slid out of the scanning device without hindrance.

As is apparent from the above description, there is a number of variations for the embodiment described without departing from the scope of the invention. This especially applies in connection with the manner in which the different functions are controlled by the slide 18 and more particularly in which by this slide the lever arm 14 carrying the set of contacts 16 can be pivoted towards the operating position of a chip card 42 and away from this position, respectively, and also the manner in which the slide 18 itself is displaced by the operating member 19. A perfect operation of the scanning device is guaranteed in that the contacting of a chip card in its operating position takes place in a reliable manner without any risk of damage of such a card or damage of the contact device itself. Further, a simple and reliable operation of the scanning device and a simple and space-saving construction of the latter are attained due to the measures taken.

We claim:

1. A scanning device for a chip card having a lever arm, which is pivotably journalled, carries a set of contacts and can be pivoted towards a chip card inserted into the scanning device and then occupying an operating position, the set of contacts contacting contacts provided on the chip card, characterized in that the lever arm is pivoted towards the operating position of a chip card by a slide slidably guided parallel to the direction of insertion of a chip card into the scanning device, which slide is in turn displaceable by an individual operating member that can be operated by hand.

2. A scanning device as claimed in claim 1, characterized in that the slide can be displaced, starting from a rest position, by means of the operating member in opposite directions to two further positions, it causing during its displacement from the rest position in a direction equal to the direction of insertion of a chip card into the scanning device the lever arm carrying the set of contacts to be pivoted towards the operating position of a chip card and sliding a chip card at least in part out of the scanning device furing its displacement from the rest position in a direction opposite to the direction of insertion of a chip card into the scanning device through a shoulder provided at it.

3. A scanning device as claimed in claim 1, characterized in that, in order to pivot by means of the slide the lever arm carrying the set of contacts towards the operating position of a chip card, a further lever arm is provided, which can be pivoted by the slide against the action of a spring, is journalled on the side of the device and in turn cooperates with the lever arm carrying the set of contacts.

4. A scanning device as claimed in claim 3, characterized in that the further lever arm has a bifurcate end, by which it encloses a shoulder provided at the lever arm carrying the set of contacts.

5. A scanning device as in claim 1, characterized in that upon displacement of the slide for pivoting the lever arm carrying the set of contacts towards the operating position of a chip card a locking device controlled by the slide and subjected to the action of a spring is released, which attempts to lock the insertion track of a chip card into the scanning device in the operating position of a chip card in the scanning device.

6. A scanning device as claimed in claim 5, characterized in that for controlling the locking device by means of the slide a spring-loaded drag slide is provided, which can be coupled to the slide, cooperates with the locking device and is taken along by the slide during its displacement for pivoting the lever arm carrying the set of contacts towards the operating position of a chip card.

7. A scanning device as in claim 1, characterized in that upon displacement of the slide for pivoting the lever arm carrying the set of contacts towards the operating position of a chip card a switching device can be operated from the slide, which switches on the electrical functions of the scanning device.

8. A scanning device as claimed in claim 7, characterized in that the switching device is functionally connected in series with a further switch, which is switched on from a chip card located in its operating position in the scanning device.

9. A scanning device as claimed in claim 8, characterized in that additionally an indication device can be switched on by the further switch.

* * * * *